Dec. 31, 1968   C. S. WHITE   3,418,706
METHOD AND APPARATUS FOR MAKING BEARINGS
Filed Sept. 25, 1967   Sheet 1 of 3

INVENTOR.
Charles S. White
BY
Barnard, McGlynn & Reising
ATTORNEYS

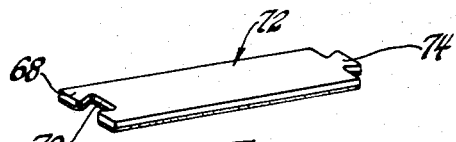
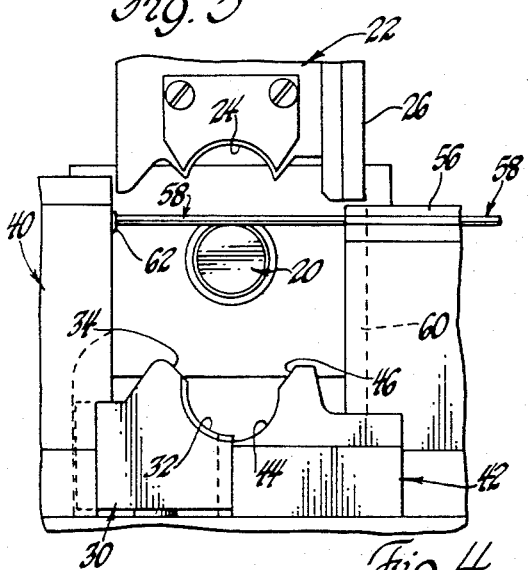
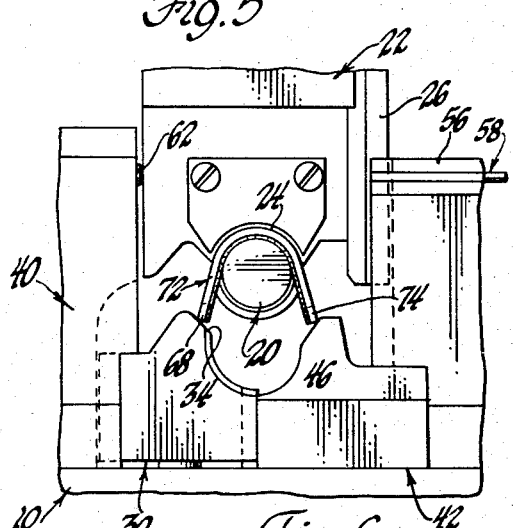
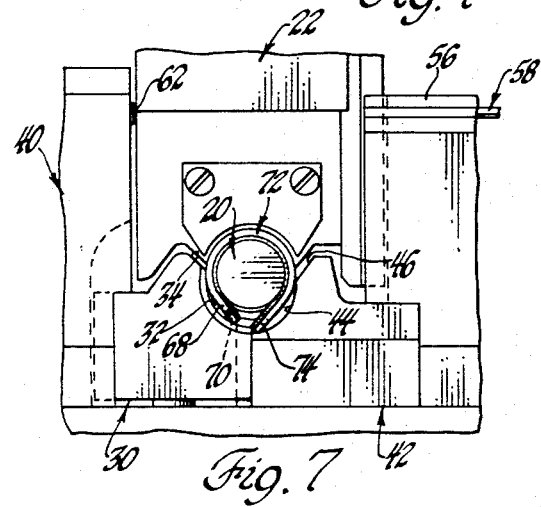
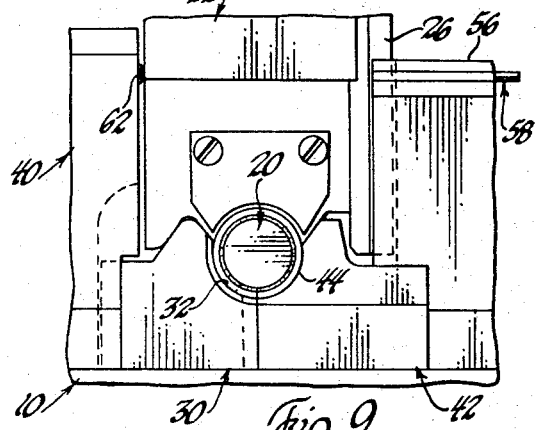
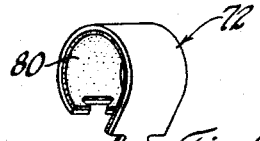
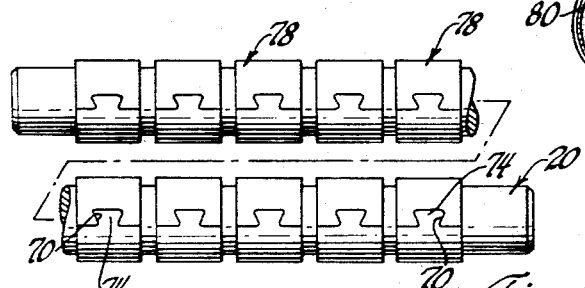
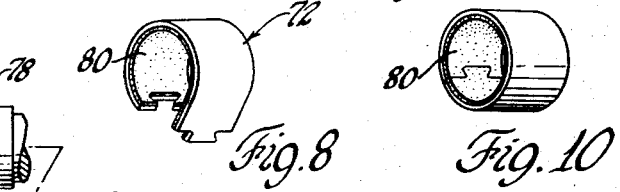
INVENTOR.
Charles S. White
BY
Barnard, McGlynn & Reising
ATTORNEYS Dec. 31, 1968   C. S. WHITE   3,418,706
METHOD AND APPARATUS FOR MAKING BEARINGS
Filed Sept. 25, 1967

INVENTOR.
Charles S. White
BY
Barnard, McGlynn & Reising
ATTORNEYS

United States Patent Office 3,418,706
Patented Dec. 31, 1968

3,418,706
METHOD AND APPARATUS FOR MAKING BEARINGS
Charles S. White, 35826 41st St., Palmdale, Calif. 93550
Continuation-in-part of abandoned application Ser. No. 472,956, July 19, 1965. This application Sept. 25, 1967, Ser. No. 676,000
31 Claims. (Cl. 29—149.5)

ABSTRACT OF THE DISCLOSURE

In accordance with the invention, low friction bearings are manufactured by wrapping around a curved member such as a shaft or a ball, a metal strip preferably having a low friction facing and having complementary locking means at the opposite ends thereof. The locking means are locked together to form an annulus around the shaft or ball as the final step in the wrapping operation. In the preferred embodiment the central portion of the strip is first bent into conformity with the shaft or ball after which one end of the strip and then the other end are wrapped against the shaft or ball. To accomplish this, the apparatus has a plurality of die members which function in sequence to contact the various portions of the strip and wrap them against the shaft or ball in the order described. A long length of strip can be fed to the apparatus and cut to proper length, with the locking means formed therein, by the apparatus just prior to the wrapping operation. Hence, self lubricating bushings, ball joints and similar bearings can be rapidly manufactured to close tolerances and at low cost.

---

This invention relates to a method and apparatus for manufacturing annular bearings or the like. This application is a continuation-in-part of application Ser. No. 472,956 filed July 19, 1965, now abandoned.

Bearings for many types of applications are in the form of an annular element disposed about a shaft or ball to allow sliding movement, the element being disposed within another member which supports the shaft or ball. The inner shaft or ball is permitted movement relative to the outer structure for whatever purpose may be desired. Such bearings must be precisely manufactured, both as to dimension and shape, in order to properly support the inner member relative to the outer member and to allow low friction movement of one of the members relative to the other.

Numerous methods for making such annular bearings are well known in the prior art. However, most of these methods are costly and cumbersome, requiring a large number of operations and requiring extreme precision in the machinery and methods. For example, one method of forming a bearing to be received over a truncated spherical ball in the typical rod end universal joint or the like, is to place such spherical ball in a suitable swaging die having spherical die cavities, placing a precisely formed cylindrical ring in proper position around the spherical ball, and then moving the swaging dies together so as to conform the ring to the outer surface of the ball. Due to the spherical shape of the swaging dies required to accomplish this result, the resultant assembly must be further machined and ground before it can be installed within an outer rod end member or the like where it is to be affixed. An operation such as this is time consuming and expensive, and does not admit of progressive or automated formation of bearing members in an economical and efficient manner.

The method and apparatus of this invention enables forming annular bearing elements in such a way that permits progressive and high speed formation without sacrificing precision dimensions or shape in the finished bearing element. The method contemplates a mandrel received and supported in a machine having an upper forming die, and first and second lower forming dies. A bearing blank, which can comprise a strip of metal sheet stock, is disposed between the mandrel and the upper forming die, the blank being provided with complementary locking means on the opposite ends thereof. The blank is partially formed around the mandrel by the upper forming die and the first lower forming die forms one end of the blank around the mandrel. Following this operation, the second lower forming die forms the opposite end of the blank around the mandrel, and in such a way as to interlock the locking means to secure the ends of the blank together and to maintain the bearing element in an annular shape. Following these operations, the mandrel may be indexed and a new blank formed around the mandrel in the same manner. After a plurality of complete cycles, the mandrel will have a plurality of spaced bearing members formed thereon, and the mandrel may then be mounted in a suitable machine for machining or grinding the outer surface of the bearing elements. The machining or grinding operation is carried out with reference to the outer surface of the mandrel so as to assure exact concentricity between the inner surface of the bearing elements and the outer surface of the bearing elements for proper operation when assembled in the machinery intended. For the manufacture of cylindrical bearings, i.e., bushings, an elongated cylindrical rod can be used as the mandrel whereas for the manufacture of spherical bearings, ball joints or the like, the mandrel can consist of the ball element of the desired bearing, such ball elements being suitably supported for feed into the machine between the forming dies.

The method and operation, as generally above-described, provides an extremely economical and efficient manner of forming bearing elements. At the same time, the method and apparatus are extremely versatile in forming different types of annular bearings or the like for different operational purposes. Proper dimensions and shapes are maintained, as well as necessary concentricity and other design parameters. Such method and apparatus further permits the use of low friction linings on the bearing elements, where such low friction linings are desirable in the final assembly and operation of the bearing structure. Considerable savings in time, cost and labor are easily affected with a simple and uncomplicated apparatus and method.

These and other advantages will become more apparent as the description proceeds, having reference to the drawings in which:

FIGURE 3 is a perspective view of one end of the strip from which the bearing blanks are formed;

FIGURE 4 is a partial elevational view of the machine illustrated in FIGURES 1 and 2, showing the machine in one position;

FIGURE 5 is a perspective view of a bearing blank;

FIGURE 6 is a partial elevational view of the machine illustrated in FIGURES 1 and 2, illustrating the various parts in a second position of operation;

FIGURE 7 is a partial elevational view of the machine illustrated in FIGURES 1 and 2, illustrating yet another position of operation;

FIGURE 8 is a perspective view of the bearing blank in the condition illustrated in FIGURE 7;

FIGURE 9 is a partial elevational view of the machine illustrated in FIGURES 1 and 2, illustrating the parts in the final position of operation;

FIGURE 10 is a perspective view of the bearing blank in the condition illustrated in FIGURE 9;

FIGURE 11 is an elevational view of the mandrel with a plurality of bearing elements mounted thereon;

Figure 1:
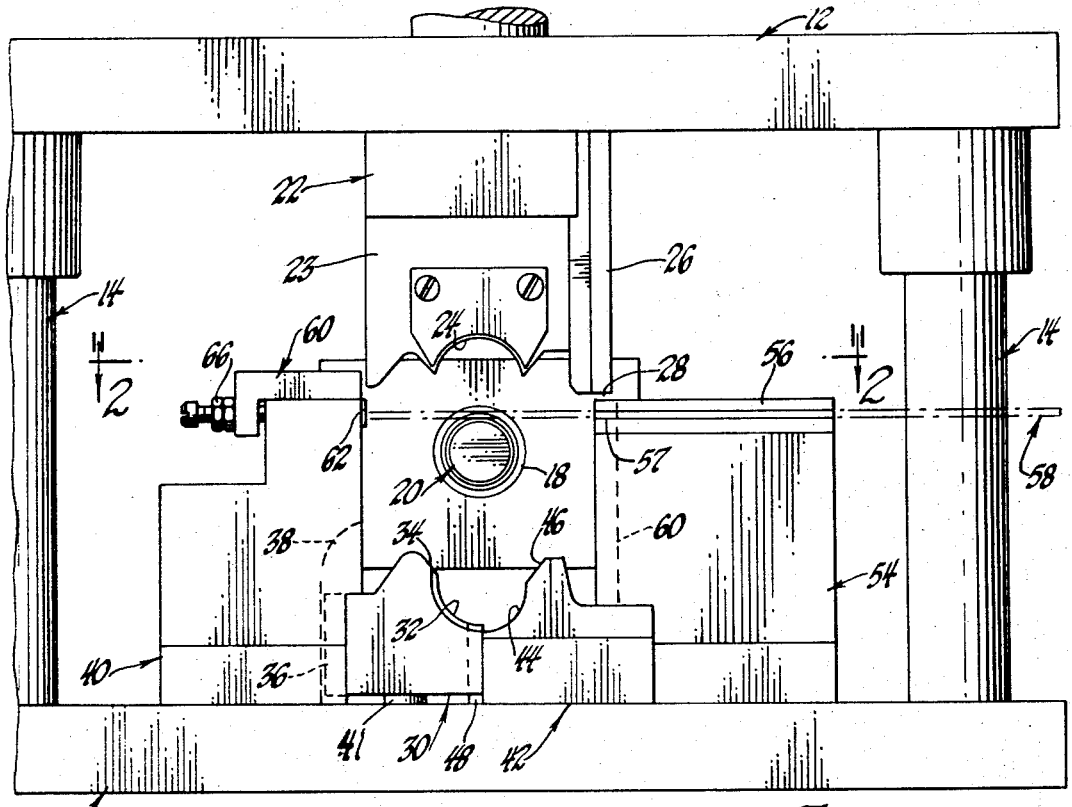
FIGURE 1 is an elevational view of a portion of a machine embodying the invention, illustrating the position of the various parts prior to the initiation of the method.
Figure 2:
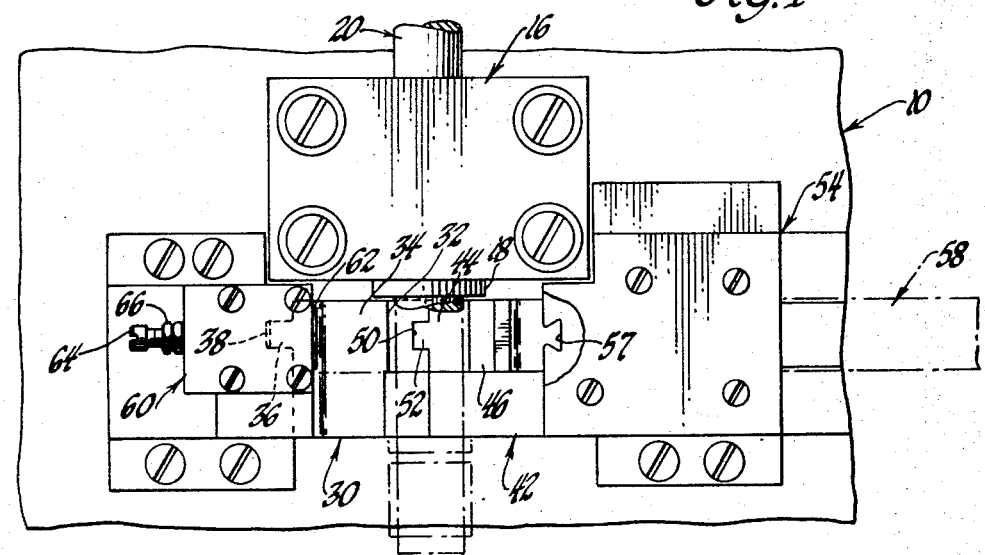
FIGURE 2 is a cross-sectional view of a part of the machine illustrated in FIGURE 1, taken substantially along the line 2—2 of FIGURE 1, and looking in the direction of the arrows.

Referring more particularly to the drawings, FIGURES 1 and 2 best show the overall pertinent portions of the machine. A machine frame, indicated generally by the numeral 10, is suitably mounted on a support, such as the floor, and has movably suspended above it a platen, illustrated generally by the numeral 12. Suitable guide members 14 provide for movement of the platen 12 relative to the base frame 10. Much of the machine is of well-known construction, and the operational details will be apparent to those having skill in the art.

Movably mounted relative to the machine frame 10 is a mandrel support member, illustrated generally by the numeral 16, having a mandrel support collet 18 suitably disposed therein. A cylindrical mandrel, illustrated generally by the numeral 20, is received in the collet 18 and supported in the support means 16 for purposes to become hereinafter more apparent.

Secured to the upper platen 12, and movable therewith, is an uper die assembly, illustrated generally by the numeral 22. Upper die assembly 22 includes a forming die portion 23 having a cylindrical forming surface 24 disposed above the mandrel 20 and generally vertically aligned therewith. Upper die assembly 22 also includes a punch member 26 having a cutting edge 28 disposed below the forming surface 24.

Below the mandrel 20 is a first lower forming die illustrated generally by the numeral 30. Lower forming die 30 includes an arcuate forming surface 32 and an angular forming surface 34, the purpose for which will become hereinafter more apparent. An outwardly directed flange 36 on the lower forming die 30 is received in a slot 38 formed in a support member, illustrated generally by the numeral 40, located adjacent the lower forming die 30. Lower forming die 30 is permitted limited vertical movement relative to the machine frame 10, and is permitted such movement by any suitable well-known means (not shown). A post or the like 42 supports the lower forming die 30 in its movement between upper and lower positions, as will become hereinafter more apparent.

A second lower forming die, illustrated generally by the numeral 42, is disposed on the machine frame 10, and below the mandrel 20. Forming die 42 includes an arcuate forming surface 44, and an angular forming surface 46, for purposes to become hereinafter more apparent. A vertical flange 48 on the die 42 is received in a suitably shaped slot 50 in the first lower forming die 30 so that when the first lower forming die 30 moves in its vertical manner, it will be properly directed between the slot 38 in the support member 40, and the slot 50 in the second lower forming die 42 rigidly secured to the machine frame 10. The upper surface 52 of the flange 48 is arcuate so as to continue the arcuate surface 32-44 when the first lower forming die 3 is in its downmost position.

Disposed adjacent the second lower forming die 42, and to one side of the mandrel 20, is a support member, illustrated generally by the numeral 54. Support member 54 has at the upper surface thereof a strip supporting means 56 to support a metal strip, illustrated in dashed and dotted lines at 58, and which will be hereinafter more particularly described. Support means 56 also includes a punching die 57 in registry with the punch 26, and immediately below the die 57 is a slot 60 to receive the punch 26 as the upper platen 12 and the upper forming die assembly 22 move downwardly relative to the support member 54.

Disposed above the support member 40 on the opposite side of the mandrel 20 is an adjustable strip stop means, illustrated generally by the numeral 60. Strip stop means 60 includes a member 62 extending inwardly from the face of the support member 40, which may be moved in a horizontal direction by means of a set screw 64 properly locked in place by lock nuts or the like 66.

In describing the operation of the machine illustrated in FIGURES 1 and 2, reference is best had to FIGURES 3 through 11. A strip of metal 58 having a low friction material bonded to the lower surface thereof, as hereinafter described, is fed into the strip support means 56 and as the leading edge 68 reaches the punch die 57 the upper platen is lowered to punch a notch 70 in the end of the strip 58. Such notch 70 is of inwardly opening generally triangular shape to eventually receive a tab of complementary shape. The upper platen 12 is then raised to clear the punch 26 from the die 67, and the strip 58 is advanced to the strip stop 62. At this point, the strip 58 is disposed above the mandrel 20 which extends outwardly from the mandrel support means 16. The upper platen 12 is then again moved downwardly, and the punch 26 contacts the strip 58 in the punch die 57. Thus, a blank is severed from the strip 58, such blank being illustrated generally by the numeral 72, in FIGURE 5.

Blank 72 has the leading end 68 formed with a notch 70 as heretofore described, and has at the opposite end thereof a complementarily shaped tab 74 which, since formed by the same punch as formed the notch 70, will properly fit in the notch 70 as the operation proceeds. Tab 74 is of generally triangular shape, expanding outwardly from the body of the blank 72.

As the upper forming die assembly 22 continues to move downwardly, as illustrated in FIGURE 6, the arcuate forming surface 24 begins to wrap the blank 72 about the mandrel 20. With continued downward movement, both the upper forming die assembly 22 and the mandrel support means 16, as well as the mandrel 20, move downwardly with the platen 21. Punch 26 is of course moving freely in the slot 60 formed in the right support member 54. Next, the leading end 68 of the blank 72 contacts the angular forming surface 34 on the first lower forming die member 30 to be directed downwardly and inwardly. Similarly, the tab end 74 of the blank 72 contacts the angular forming surface 46 on the second lower forming die 42 to begin to move downwardly and inwardly. At this point, the first lower forming die 30 is in its upward position, the base thereof being spaced in distance away from the machine frame 10.

Continued downward movement of the upper die assembly 22 and the mandrel 20 deforms the blank 27, as illustrated in FIGURES 7 and 8. The leading end 68 of the blank 72 is disposed between the mandrel 20 and the arcuate surface 32 on the first lower forming die 30, and the tab end 74 is disposed between the arcuate surface 44 of the second lower forming die 42 and the mandrel 20. It is to be noted that the first lower forming die member 30 is still in its upward position. Further downward movement causes the first lower forming die 30 to deform the leading end 68 of the blank 72 into engagement with the mandrel 20 to give it the proper configuration, and to tuck the leading end 68 between the mandrel 20 and the tab 74.

The final step in the cycle is to continue downward movement of the upper forming die assembly 22, the mandrel 20, and the first lower forming die 30, which will cause the second lower forming die 42 to deform the tab end 74 of the blank 72 into engagement with the mandrel 20. At the same time, since the first lower forming die 30 actuates before the lower forming die 42, the tab 74 will be fitted into the notch 70 in aligned and contiguous engagement therewith, and the two ends of the blank 72 will be properly locked. The final configuration and position of the various parts is best illustrated in FIGURES 9 and 10. It is there shown that the lower forming die 30 is in its down-most position against the machine frame 10, and the arcuate surface 32 of the lower forming die 30, as well as the arcuate surface 44 of the lower forming die 42, have deformed the blank 72 completely around the mandrel 20. At the same time, the tab 74 has been fitted into the notch 70 to lock the blank 72 around the mandrel 20. The final cylindrical construction is illustrated in FIGURE 10.

The machine is then recycled to raise the platen 12, the upper forming die assembly 22, and the mandrel 20, as well as the mandrel support 16, to the original position. The mandrel 20 is indexed outwardly to receive a second blank 72, and the entire cycle is repeated. After a series of cycles, the mandrel has formed therearound a plurality of blanks 72, such as illustrated in FIGURE 11. The series of elements are spaced a light distance apart as shown.

It is highly desirable to assure that the outer surface of the bearing elements 78 disposed on the mandrel 20 will be concentric with the inner surface of the bearing elements 78. To accomplish this, the assembly, including the mandrel 20 and the bearing elements 78, may be transported to a suitable machine, such as a centerless grinder. Since the blanks 72 have been formed to the outer surface of the mandrel, the inner surfaces of the blanks will be concentric with the outer surface of the mandrel. By grinding or otherwise machining the outer surfaces of the bearing elements 78 with reference to the outer surface of the mandrel 20, and thus will be concentric with the inner surfaces of the bearing elements. Following such grinding or machining operation, the bearing elements 78 may be stripped from the mandrel 20 for installation in the desired machine elements.

The inner surfaces of the bearing elements are provided with a layer of low friction material in order to provide the lubricity for the bearing assembly upon its completion. Such low friction material may take any suitable form. However, it is preferred that such material include fibers of low friction organic polymeric material, such as Teflon, in a matrix of thermosetting resin, and more particularly, it is preferred that the material be a cloth formed of the low friction fibers and bonded by a thermosetting resin, such as phenolic resin, to the inner surface of the bearing elements. Such Teflon cloth lined bearings are covered by Patents Nos. 2,885,248 and Re. 24,765 in the name of Charles S. White. The low friction material can be bonded to the strip 58 prior to the forming operation. Where the Teflon cloth is bonded to the strip by a phenolic or other thermosetting resin, the resin can be applied to the strip and back of the cloth in liquid form, i.e., in the A stage, and, with the cloth thus bonded to the strip 58, then heated sufficiently to remove volatiles and polymerize the thermosetting resin to the B stage. In its B stage condition the resin is solid but is still thermoplastic and flexible and relatively soft such that the strip can be bent without cracking the resin layer.

With the resin in the B stage, the strip 58 is fed into the machine and cut into blanks 72 and formed about the mandrel 20 in the above-described manner. Following the several cycles of the machine, the mandrel 20 with the blanks 78 mounted thereon, and having the low friction material 80 between the bearing element 78 and the mandrel 20, may be conveyed to a curing oven where the phenolic resin bonding layer is cured to hardened thermoset condition, i.e., to the C stage. Following this operation, the mandrel and bearing element assembly may be transported to a machining or grinding operation to obtain the desired concentricity.

Particularly where thermosetting resin is used in, or as the bonding layer for, the low friction liner, the material of which the mandrel 20 is constructed is of importance in that during curing of the resin it is desirable that not only heat but also pressure be applied. With the bearing on the mandrel during curing, the thermal expansion of the mandrel, as the heat is applied, can provide the desired pressure. A steel mandrel is excellent for most purposes; however, where a higher pressure during cure is desired an aluminum mandrel can be utilized because of its higher thermal expansion rate.

Since, in the forming process of the bearing elements, the tab 74 is fitted into the notch 70, the manner in which the punch 26 engages the material is important. It is known that when a punch severs sheet metal in such manner, one surface of the metal at the severed end will be smooth and the opposite surface will be rough or burred. The opposite is true of the part severed. In this instance, it is preferred that the lower edge of the tab be smooth and the upper edge surface of the notch be smooth to ease the entry of the tab into the notch. If the method of assembly were the opposite; that is, if the notch were to be formed over the tab, the lower edge of the notch should be smooth and the upper edge surface of the tab should be smooth.

The foregoing description has been related to a bearing element that is cylindrical, both on its inner surface and on its outer surface. However, the method and apparatus may be modified in order to provide a bearing element of spherical or other compound curvature. For example, and with reference to FIGURE 12, a thrust bearing having a compound curvature and made in accordance with the invention is illustrated. An inner bearing element of compound curvature, illustrated generally by the numeral 82, is provided with a bore 84 to receive a suitable machine element. An outer structure, illustrated by the numeral 86, surrounds the ball 82, element 86 being a resilient rubber or other elastomeric member bonded to element 88 and useful for mounting the bearing in the suspension system of an automobile to provide shock absorption. It is obvious that the bearing element, illustrated generally by the numeral 88, must have an inner surface 90 of compound curvature in order to conform to the inner bearing elemnt 82. This may be accomplished in the aforedescribed apparatus and method by providing a series of elements 82 in spaced array on a mandrel, illustrated by dashed and dotted lines 92. A low friction lined metal strip is then bent around each element, as described above with reference to FIGURE 19 though in this instance the metal strip, as it is bent around the element 82, is deformed to compound curvature to conform to the curvature of element 82. The shape of the forming surfaces 23, 32 and 44 of the forming die members are, of course, modified accordingly. That is, instead of being of cylindrical shape they are of compound curvature to cause the strip to conform to the curvature of element 82 as the strip is wrapped therearound. The bearing element 88 is provided with a tab 96 properly seated in a notch 98 to maintain the annular shape of the bearing member. The bearing can have a non-spherical compound curvature, for example, a barrel shape, and hence serve to allow rotation of element 82 within bearing element 88 and with the bearing being capable of taking a thrust load in the direction of the longitudinal axis of the bore in the element 82. The bearing can, of course, be spherical if desired to enable universal movement between the bearing elements. After the element 88 is formed around the inner element 82 and the resin of the low friction liner cured, as described above, the annulus of rubber 86 can be bonded to the outer surface of element 88.

Figure 13:
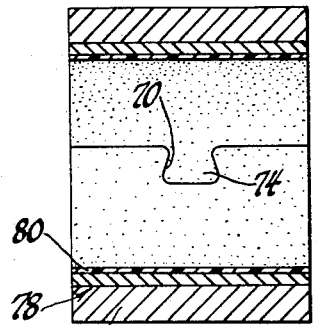
FIGURE 13 is a cross-sectional view of another form of bearing structure manufactured in accordance with the apparatus and method illustrated in FIGURES 1 through 11.

Reference to FIGURE 13 illustrates a use of a bearing element, such as illustrated in FIGURE 10. The bearing element 78 has a low friction material 80 bonded thereto and is received in an outer housing 100. Bearing element 78 may receive a suitable shaft or the like in the interior thereof. The tab 74 is properly seated in the notch 70 to maintain the annular shape of the bearing element 78.

Figure 14:
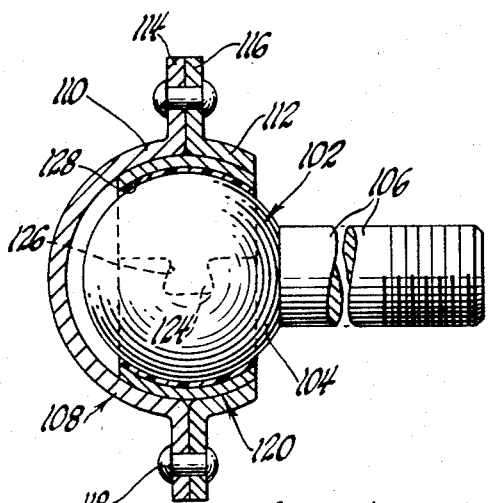
FIGURE 14 is a cross-sectional view of yet another form of the bearing, this one a ball joint, made in accordance with the invention.

Still another bearing installation is illustrated in FIGURE 14 wherein a spherical ball and socket joint is provided. A ball member 102 has a ball portion 104 and a threaded stud 106 extending therefrom, the threaded stud permitting mounting of the assembly in a suitable machine element. An outer sheet metal housing, illustrated generally by the numeral 108, includes a first cup member 110 and a second cup member 112, each having outwardly directed flanges 114 and 116, respectively. The flanges are secured together by rivets or the like 118. A spherical bearing element 120 comprising a metal strip having a low friction liner is formed around the ball 104 in the manner heretofore described, the bearing element 120 having a tab 124 suitably received in a notch 126. The element 120 is secured in fixed engagement to the housing 108. With this type of construction, a universal ball and socket joint is easily and simply provided.

Figure 15:
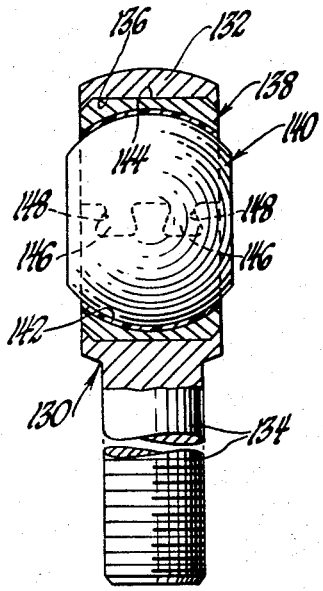
FIGURE 15 is a cross-sectional view of still another form of spherical bearing manufactured in accordance with the method illustrated in FIGURES 1 through 11.

FIGURE 15 illustrates a typical rod end type joint wherein a rod and member, illustrated generally by the numeral 130, is provided with a banjo portion 132 and a stud portion 134. The banjo portion 132 is provided with a cylindrical inner bore 136 to receive the bearing element, illustrated generally by the number 138. Bearing element 138 in turn receives a truncated spherical ball, illustrated generally by the numeral 140. In this instance, it will be noted that the bearing element 138 has a spherical inner surface 142 conformed to the spherical surface of the ball 140 and a cylindrical outer surface 144 which is of the same configuration as the cylindrical bore 136 in the banjo 132.

Figure 12:
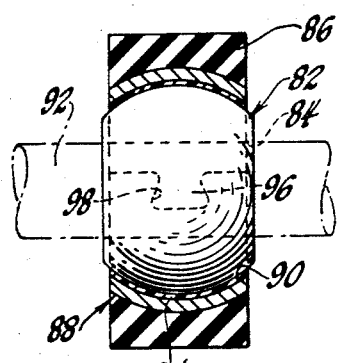
FIGURE 12 is a cross-sectional view of a bearing of compound curvature manufactured in accordance with the invention.

The formation of the bearing element 138 is according to the previously described method and apparatus for forming the spherical bearing of FIGURES 12 or 14. Under such condition, the outer surface of the spherical bearing element must be machined to provide the cylindrical surface 144. Removal of material at the crown of the spherical bearing element would decrease the thickness of the tab and notch engagement. For this purpose bearing element 138 is shown to include a pair of spaced tabs 146 received in spaced notches 148, the tabs and notches being displaced from the center of the bearing element 138 toward the edges where the thickness of the element is not as greatly reduced during the machining operation.

Thus, a method and apparatus for forming a bearing element are provided which are extremely simple in operation, and which permits a considerable saving in time, cost and labor over prior art methods and apparatus. The wide versatility of the method and apparatus makes the same adaptable to many different bearing structures.

Numerous changes and modifications in both the method and the apparatus will occur to those having skill in the art after having had reference to the foregoing description and drawings. However, it is not intended to limit the method and apparatus of the invention by the description and drawings, but by the scope of the appended claims in which:

The embodiments of the invention in which an exclusive property or privilege is claimed are defined as follows:

1. A method for manufacturing a bearing comprising the steps of forming a blank with complementary locking means at opposite ends thereof, wrapping the central portion of said blank against an annular surface of a member to form said central portion to arcuate shape, wrapping one of said ends of said blank against said surface to form said end to arcuate shape, and thereafter wrapping the other of said ends of said blank against said surface to form said other of said ends to arcuate shape and to mate said locking means in aligned contiguous locked engagement with each other.

2. A method as set forth in claim 1 wherein said blank is an elongated strip of metal having a low friction facing bonded thereto by a thermosetting resin, said thermosetting resin being in a thermoplastic relatively soft condition while said portions of said blank are formed to arcuate shape and being cured to hardened thermoset condition by heating the assembly of said member with said blank wrapped therearound whereby the thermal expansion of said member applies pressure to said thermosetting resin during the curing thereof.

3. A method as set forth in claim 2, wherein said member is of a metal which has a higher coefficient of thermal expansion than that of the metal of said blank.

4. A method as set forth in claim 1 wherein said member has a surface of compound curvature against which said blank portions are formed to conform to the curvature thereof.

5. A method as set forth in claim 4 wherein said surface of said member is of spherical curvature.

6. A method as set forth in claim 1, wherein said complementary locking means comprises a tab at the end of said blank which is last formed to arcuate shape and a notch in the end of said blank which is earlier formed to arcuate shape.

7. A method for making a bearing comprising wrapping an elongated metal strip around a bearing element having an annular surface of compound curvature to bend said strip along its longitudinal axis into an annulus, said annulus being of compound curvature conforming to said surface of said bearing element.

8. A method as set forth in claim 7 wherein said elongated strip is initially flat and is simultaneously bent about two axes of curvature at right angles to each other when wrapped around said element.

9. A method as set forth in claim 8 wherein said strip has a complementary locking means at the opposite ends thereof, said complementary locking means being engaged with each other after said strip is wrapped around said bearing element to thereby secure said annulus around said element.

10. A method as set forth in claim 8 wherein said blank comprises a metal strip having a facing of low friction material which engages said bearing element when said blank is wrapped therearound.

11. A method as set forth in claim 10 wherein said facing of low friction material is bonded to said metal strip by a thermosetting resin, said resin being in a thermoplastic relatively soft condition while said blank is wrapped around said bearing element and being cured to hardened thermoset condition after said blank is wrapped around said element.

12. A method as set forth in claim 8 wherein said surface of compound curvature is a spherical surface.

13. A method as set forth in claim 8 and including the additional step of machining the outer surface of said annulus to cylindrical shape after said locking means are engaged with each other.

14. A method as set forth in claim 8 and including the additional step of positioning and locking said annulus in fixed position within an outer annular member.

15. A method of making bearings comprising the steps of placing a member having an annular outer surface between first, second and third forming dies, placing an elongated blank between said first die and said member, moving said first die relative to said member to deform the center of said blank against and into conformity with the surface of said member, moving said first die and said member relative to said second die to deform one end of said blank against and into conformity with the surface of said member, and moving said first die and said member relative to said third die to deform the other end of said blank against and into conformity with the surface of said member thereby to form said blank into an annulus around and conforming to the curvature of said member.

16. A method as set forth in claim 15 wherein said blank is formed with complementary locking means at opposite ends thereof, said locking means being brought into locking engagement with each other as said last-mentioned end of said blank is deformed against said member.

17. A method as set forth in claim 16 wherein at least one of said complementary locking means is formed in said blank after said blank is positioned between said first die and said member.

18. A method as set forth in claim 17 wherein said locking means comprise a tab at one end of said blank and a notch at the other end of said blank, said tab being formed in said blank after said blank is positioned between said first die and said member.

19. A method as set forth in claim 15 wherein said member has an annular surface of compound curvature and wherein said die members have surfaces of compound curvature which engage said blank to thereby cause said center portion and said ends of said blank to deform to compound curvature conforming to the compound curvature of said member.

20. A method of making bearings comprising the steps of bonding a low friction material to one surface of a metal strip, cutting said strip into a plurality of blanks having complementary locking means at the opposite ends thereof; forming said blanks into anuli in axially spaced array around an elongated mandrel, the locking means at the opposite ends of each of said annuli being brought into engagement with each other during said forming, and machining the outer surfaces of said annuli while on said mandrel to be concentric with said mandrel.

21. A method as set forth in claim 20 wherein said elongated mandrel comprises a rod having a plurality of spaced annular members of compound outer curvature therearound, and wherein each of said blanks is formed around one of said annular members.

22. A method of making bearings comprising the steps of forming a first blank to have complementary locking means at the opposite ends thereof, forming said first blank around an elongated mandrel and engaging said locking means with each other, forming a second blank to have complementary locking means at the opposite ends thereof, forming said second blank around said mandrel axially spaced from said first blank and engaging said locking means of said second blank with each other, and machining the outer surfaces of said first and second blanks while on said mandrel to be concentric with the surface of said mandrel.

23. A machine for making bearings comprising a mandrel, means for supporting said mandrel, a first forming die for forming a central portion of an elongated blank around said mandrel, a second forming die for forming one end of the blank around said mandrel, and a third forming die for forming the other end of the blank around said mandrel, said forming dies being operated in timed relation such that one end of the blank is formed around said mandrel before the other end of the blank is formed around said mandrel.

24. A machine as set forth in claim 23 wherein said mandrel includes an enlargement of compound curvature around which said blank is formed.

25. A machine for making bearings comprising a mandrel, means for supporting said mandrel, means for supporting a strip of bearing material adjacent said mandrel, means for cutting the strip of material such that a portion of the strip of material extends on either side of said mandrel, a first forming die disposed on the opposite side of the portion of the strip of material from said mandrel, said first forming die being movable toward said mandrel for forming the central portion of the strip partially around said mandrel, a second forming die for forming one end portion of the strip around said mandrel, and a third forming die for forming the other end portion of the strip around said mandrel, said third forming die operating after said second forming die.

26. A machine as set forth in claim 25 wherein said means for cutting the strip of material is formed to cut a tab at one end of the portion of the strip and a complementary notch at the other end of the portion of the strip, whereby each portion cut from the strip is provided with complementary locking means at the opposite ends thereof.

27. A machine for making bearings comprising a mandrel, means for supporting said mandrel, means for supporting an elongated strip of material such that a portion of said strip extends across said mandrel, means for cutting said portion of said strip from said strip, a first forming die for forming said portion of said strip partially around said mandrel, and second and third forming dies for forming the ends of said portion of said strip around said mandrel, said second forming die operating in timed relation prior to said third forming die.

28. A machine as set forth in claim 27 wherein said means for cutting said portion of said strip from said strip is formed to cut complementary locking means at opposite ends of said portion of said strip, and wherein the timed operation of said second and third forming dies causes said locking means to engage.

29. A machine as set forth in claim 27 and further including means for progressively advancing said mandrel along an axial path transverse to said strip to permit forming a plurality of portions from said strip in spaced array along said mandrel.

30. A machine as set forth in claim 27 and further including means for progressively advancing said strip across said mandrel as said mandrel is advanced.

31. A machine as set forth in claim 29 wherein said mandrel has a plurality of spaced annular members of compound curvature around which said portions of said strip are formed.

References Cited

UNITED STATES PATENTS

| | | | |
|---|---|---|---|
| 1,760,558 | 5/1930 | Klocke | 29—149.5 |
| 2,283,918 | 5/1942 | Dekome | 29—149.5 |
| 3,220,093 | 11/1965 | White. | |
| 3,237,278 | 3/1966 | White. | |
| 3,238,601 | 3/1966 | White. | |

THOMAS H. EAGER, *Primary Examiner.*

U.S. Cl. X.R.

29—417, 521; 72—330, 375, 400